(12) United States Patent
Obi et al.

(10) Patent No.: US 7,224,097 B2
(45) Date of Patent: May 29, 2007

(54) COMB-SHAPED ACTUATOR WITH OFF CENTERED ELECTRODES

(75) Inventors: Hiroshi Obi, Kanagawa (JP); Hiroshi Toshiyoshi, Kanagawa (JP)

(73) Assignees: Yamichi Electroncis Co., Ltd., Tokyo (JP); Koshin Kogaku co., Ltd., Kanagawa (JP)

( * ) Notice: Subject to any disclaimer, the term of this patent is extended or adjusted under 35 U.S.C. 154(b) by 327 days.

(21) Appl. No.: 11/042,155

(22) Filed: Jan. 26, 2005

(65) Prior Publication Data

US 2005/0162811 A1 Jul. 28, 2005

(30) Foreign Application Priority Data

Jan. 26, 2004 (JP) ............... 2004-017487
Jan. 26, 2004 (JP) ............... 2004-017488

(51) Int. Cl.
  *G02B 26/08* (2006.01)
  *H02N 1/00* (2006.01)
(52) U.S. Cl. ............ 310/309; 359/223; 359/225; 359/291
(58) Field of Classification Search ........... 310/309; 359/223–225, 198, 290, 291
See application file for complete search history.

(56) References Cited

U.S. PATENT DOCUMENTS

| 6,000,280 | A | 12/1999 | Miller et al. |
| 6,384,510 | B1 * | 5/2002 | Grade et al. ........... 310/309 |
| 6,497,141 | B1 * | 12/2002 | Turner et al. .......... 73/105 |
| 6,765,711 | B2 * | 7/2004 | Min et al. ............. 359/290 |
| 6,838,738 | B1 * | 1/2005 | Costello et al. ........ 257/414 |
| 2004/0145854 | A1 | 7/2004 | Tamura |
| 2005/0162811 | A1 * | 7/2005 | Obi et al. ............. 361/437 |

FOREIGN PATENT DOCUMENTS

JP 05076186 A 3/1993
JP 2000055670 A 2/2000

OTHER PUBLICATIONS

Sun et al., "A Novel Dual Axis Electrostatically Microactuation System for Micromanipulation", Intelligent Robots and Systems, Sep. 30, 2002.*
Piyabongkarn et al., "Travel Range Extension fo a MEMS Electrostatic Microactuator", IEEE Transactions of Control Systems Technology, vol. 13, No. 1, Jan. 2005.*
Uma Krishnamoorthy et al., "Self-Aligned Vertical Electrostatic Combdrives for Micromirror Actuation," Journal of Microelectromechanical Systems, vol. 12, No. 4, Aug. 1, 2003, pp. 458-464, XP002321505.
European Search Report, EP 05 29 0149, dated Apr. 14, 2005.

* cited by examiner

*Primary Examiner*—Karl Tamai
(74) *Attorney, Agent, or Firm*—Banner & Witcoff, Ltd.

(57) ABSTRACT

A comb shaped actuator having off centered electrodes to the fixed electrode and the movable electrode comprise a plurality of electrode finger units containing two fixed electrode fingers next to each other and the movable electrode finger interposed between the two fixed electrode fingers, at least two of the electrode finger units comprising off-centered electrode finger units having the movable electrode finger being off-centered with respect to a central position between the two fixed electrode fingers, the off-centered electrode finger units being located on both sides of a central line dividing the fixed electrode and the movable electrode along the opening into two parts, and directions of off-centering of the both sides being inverse to each other.

20 Claims, 9 Drawing Sheets

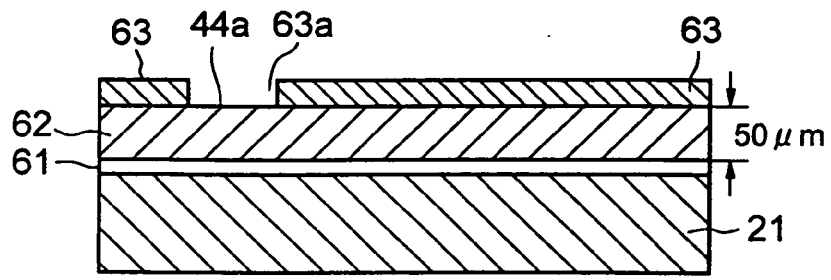
FIG. 7A
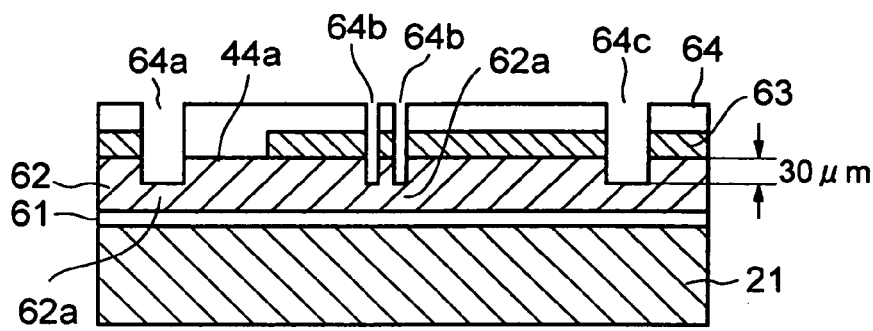
FIG. 7B
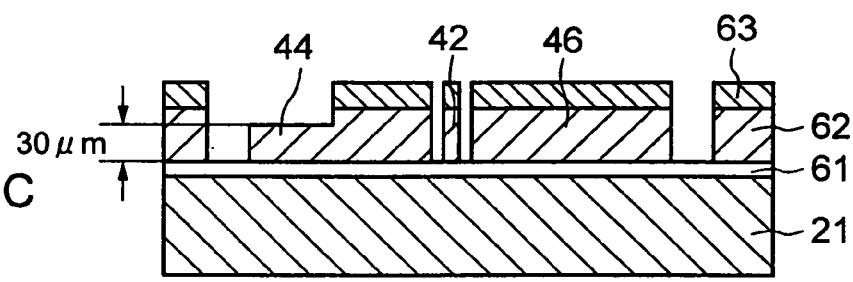
FIG. 7C
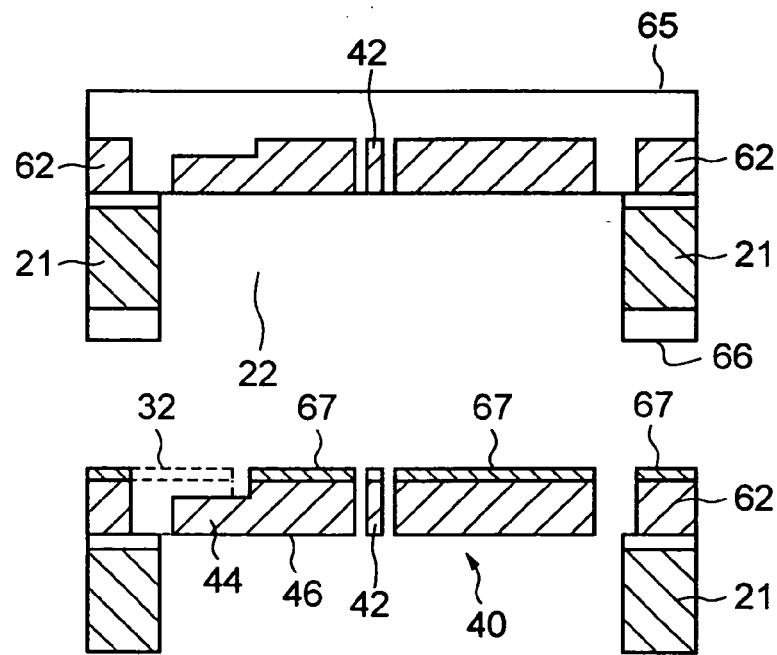
FIG. 7D
FIG. 7E FIG. 15A   PRIOR ART    FIG. 15B   PRIOR ART
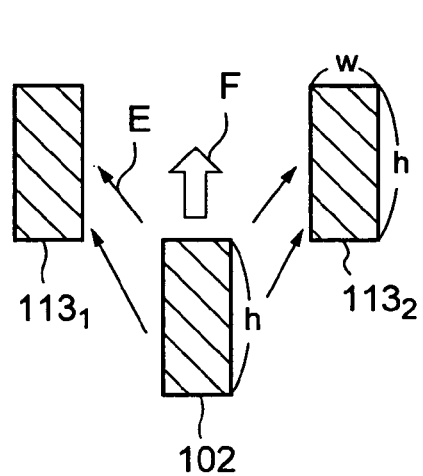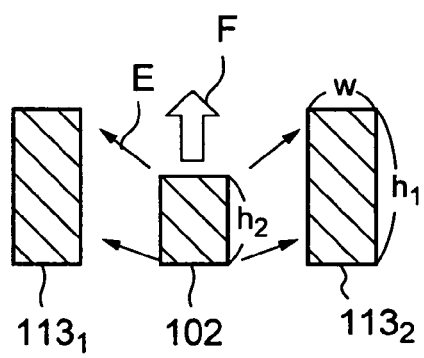
FIG. 16   PRIOR ART
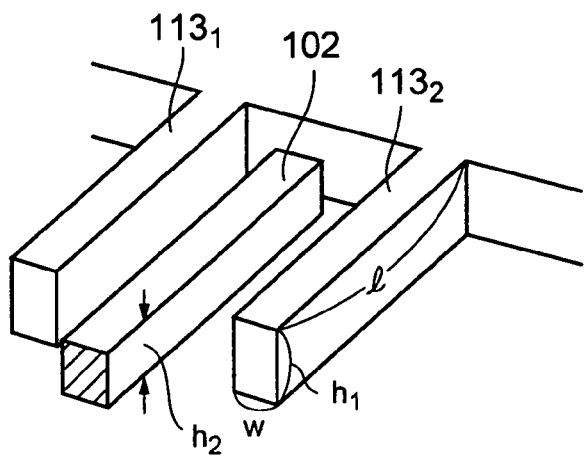

COMB-SHAPED ACTUATOR WITH OFF CENTERED ELECTRODES

CROSS-REFERENCE TO RELATED APPLICATIONS

This application is based upon and claims the benefit of priority from the prior Japanese Patent Applications Nos. 2004-17487, filed on Jan. 26, 2004 and 2004-17488, filed on Jan. 26, 2004, the entire contents which are incorporated herein by reference.

BACKGROUND OF THE INVENTION

1. Field of the Invention

The present invention relates to a comb-shaped actuator used for such as an optical control element.

2. Description of Related Art

A mirror or a filter reflecting or permeating partially a light is used for optical resonators, photo-switches and optical attenuators in the optical fiber communication. Though the diameter of a light beam impinging into or outgoing from an optical fiber is as small as 1 mm or less, a mirror per se or a mechanism attached thereto for turning or shifting the mirror makes a device large compared to the light beam. Therefore, miniaturizing the above components is required.

As a structure for miniaturization, a comb-shaped actuator has been developed. That is, the actuator comprises a movable electrode having comb-shaped electrode fingers movable by an electrostatic attracting force at the periphery of a micro mirror and a fixed electrode having comb-shaped electrode fingers as well, both the electrodes being inter-digitated together, and drives the movable electrode with an electrostatic force generated by a voltage applied between both the electrodes.

FIG. 13 explains a comb-shaped actuator in which a rectangular movable electrode 101 having movable electrode fingers 102a, 102b in the shape of teeth of a comb are arranged on two opposite sides thereof and a pair of fixed electrodes 110, 111 are provided facing the movable electrodes. Fixed electrode fingers 113a, 113b in the shape of teeth of a comb are provided on the sides of the fixed electrode facing the movable electrode, and the electrode fingers of both electrodes are combined together in an interdigital arrangement. Fixed portions 121, 122, which are located apart from the movable electrode and to act as connecting terminals of the movable electrode, are placed facing the other opposite sides 104, 105 of the movable electrode 101. Suspensions 106, 107 suspending the movable electrode 101 and connecting it with the fixed portions 121, 122 are provided at each center of the opposite sides 104, 105.

As shown in FIG. 14, the movable electrode fingers 102 of the movable electrode 101 and the fixed electrode fingers 113 of the fixed electrodes 110 (111) are located together in an interdigital arrangement. The movable electrode finger 102 intervening between a pair of neighboring fixed electrode fingers $113_1$, $113_2$ is located apart therefrom with gap regions $131_1$, $131_2$ of equal distance g0 respectively. When each electrode finger has the length l, the height h (h1, h2), and the width w shown in FIG. 15 and FIG. 16, each electrode finger receives an upward attracting force F generated by an electrostatic force E upon a voltage applied between both the electrodes if the movable electrode finger 102 is located below the upper fixed electrode fingers $113_1$, $113_2$ as shown in FIG. 15(A). When both the electrode fingers 102, $113_1$, $113_2$ are arranged on the same surface as shown in FIG. 15(B), an attracting force F in the direction of the height is generated subject to each electrode finger having different heights, e.g. the height of the fixed electrode finger being $h_1$, and the height of the movable electrode finger being $h_2$. As shown in FIG. 13, the movable electrode 101 turns around the suspension supporting members 106, 107 as shown by the mark 108.

However, if the electrostatic force generated in the gap region between the fixed electrode fingers $113_1$, $113_2$ and the movable electrode finger 102 shown in FIG. 14 does not act equally for the left and the right, a strong attracting force against the movable electrode finger acts on one of the fixed electrode fingers e.g. the electrode finger $113_1$. Even if manufacturing error of the electrode is minute, the electrostatic force is prone to be uneven. An uneven electrostatic force thus generated causes a rotating electrostatic force or an uneven electrostatic force toward one side in the movable electrode surface such as the mark 109a or 109b of FIG. 13 over whole electrode finger group. As a result, the fixed electrode and the movable electrode come into contact with each other and never separate from each other, thereby preventing predetermined turning control.

SUMMARY OF THE INVENTION

The present invention is intended to obtain a comb-shaped actuator preventing the movable electrode from coming into contact with the fixed electrode due to unfavorable extrinsic causes such as an attracting force or a shock like the above. The present invention is also intended to obtain a comb-shaped actuator eliminating instability of an electrostatic force caused by errors of the dimension or the shape of the electrode finger in manufacturing process thereof.

An aspect of a comb-shaped actuator in accordance with the present invention is comb-shaped actuator comprising:

a substrate having an opening formed therein;

a fixed electrode comprising a fixed electrode base portion provided along an inner side of the opening on the substrate and a plurality of fixed electrode finger groups arranged in parallel with each other in the shape of teeth of a comb throughout a predetermined length on the fixed electrode base portion;

a movable electrode located in the opening of the substrate and comprising a movable electrode base portion and a plurality of movable electrode fingers arranged in parallel with each other in the shape of teeth of a comb facing the fixed electrode throughout a predetermined length, the movable electrode being movable by an attracting force generated between the fixed electrode finger and the movable electrode finger subject to a voltage or a magnetic field applied between the movable electrode and the fixed electrode upon arranging the movable electrode fingers and the fixed electrode fingers in an interdigital pattern with a gap between them; and a suspension supporting member connecting the movable electrode integrally with the substrate and suspending movably the movable electrode from the substrate, characterized in that both the fixed electrode and the movable electrode comprise a plurality of electrode finger units comprising two fixed electrode fingers next to each other and the movable, electrode finger interposed between the two fixed electrode fingers, at least two of the electrode finger units comprising off-centered electrode finger units having the movable electrode finger being off-centered with respect to a central position between the two fixed electrode fingers, the off-centered electrode finger units being located on both sides of a central line dividing the fixed electrode and the movable electrode along the opening into two parts, and directions of off-centering of the both sides being inverse to each other.

Furthermore, another aspect of a comb-shaped actuator according to the present invention is an actuator comprising:

a substrate having an opening formed therein;

a fixed electrode comprising a fixed electrode base portion provided along an inner side of the opening on the substrate and a plurality of fixed electrode finger groups arranged in parallel with each other in the shape of teeth of a comb throughout a predetermined length on the fixed electrode base portion;

a movable electrode located in the opening of the substrate and comprising a movable electrode base portion and a plurality of movable electrode fingers arranged in parallel with each other in the shape of teeth of a comb facing the fixed electrode, the movable electrode being movable by an attracting force generated between the fixed electrode finger and the movable electrode finger subject to a voltage or a magnetic field applied between the movable electrode and the fixed electrode upon arranging the movable electrode fingers and the fixed electrode fingers in an interdigital pattern with a gap between them; and a suspension supporting member connecting integrally the movable electrode with the substrate and suspending movably the movable electrode from the substrate, characterized in that both the fixed electrode and the movable electrode comprise a plurality of electrode finger units comprising two (first and second) fixed electrode fingers next to each other and the movable electrode finger interposed between the two fixed electrode fingers, at least a part thereof comprising off-centered electrode finger units forming a wider gap region and a narrower gap region by a gap formed between the movable electrode finger and the first fixed electrode finger and a gap formed between the movable electrode finger and the second fixed electrode finger both being different from each other in width, a plurality thereof being located throughout a predetermined length of both the electrodes, in order to balance substantially whole electrostatic forces over the predetermined length of both the electrodes by the electrode finger units.

Furthermore an aspect of a comb-shaped actuator in accordance with the present invention is a comb-shaped actuator wherein a cross-sectional surface of the suspension supporting member is formed like a triangle and oblong as height thereof is extending in a direction of a thickness of the substrate, and forms a projection in a direction of width thereof.

A comb-shaped actuator preventing the movable electrode from coming into contact with the fixed electrode can be provided in accordance with the present invention. Also according to the present invention, a comb-shaped actuator eliminating instability of the attracting force caused by an error of the dimension and the shape of the electrode finger due to manufacturing process can be obtained.

BRIEF DESCRIPTION OF THE DRAWINGS

FIGS. 7(A) to 7(E) are schematic cross sectional views explaining manufacturing method of an embodiment of the present invention.

FIGS. 15(A) and 15(B) are schematic diagrams explaining operation of fixed electrodes and movable electrodes.

FIG. 16 is a schematic perspective view explaining dimensions of electrode fingers.

DETAILED DESCRIPTION OF THE INVENTION

Several embodiments of the present invention will be explained thereinafter referring to accompanying drawings.

(First Embodiment)

Figure 1:
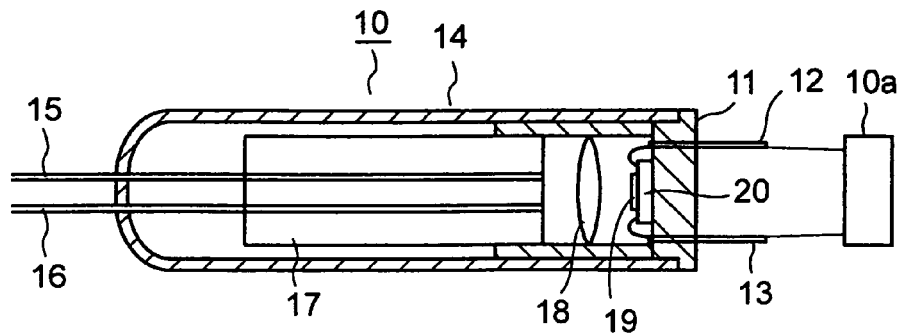
FIG. 1 is a schematic cross sectional view of a light variable attenuator of an embodiment of the present invention.

As shown in FIG. 1, the present invention is applied to a light variable attenuator 10. In the figure, two optical fibers 15, 16 are led into a cylindrical envelope 14 through one end of the envelope having electrode lead-out terminals 12, 13 piercing a stem 11 provided on the other end thereof. A twin core fiber collimator 17, a lens 18, and a mirror 19 capable of regulating a reflection angle are provided in the envelope 14, and a comb-shaped actuator 20 controlling the mirror 19 is further prepared on the surface of the stem.

The light variable attenuator 10 acts as follows. A light inputted from the light input side fiber 15 shown in FIG. 1 passes through the twin core fiber collimator 17 and the lens 18, and then is reflected by the mirror 19. The reflected light passes through the lens 18 again and combines with the output side optical fiber 16. The quantity of light incident on the output side optical fiber 16 varies upon regulating the angle of the reflected light by means of tilting the mirror 19. Namely, connecting loss generated in compliance with the angle can change the quantity of attenuation of the light. To this end, the comb-shaped actuator 20 acts in order to tilt the mirror 19. The comb-shaped actuator 20 having a fixed electrode and a movable electrode is fixed to the stem 11 of the envelope and electrode lead-out terminals 12, 13 are electrically connected with the electrodes respectively. The mirror is formed on a surface of the movable electrode thereof. A necessary driving voltage is applied to the electrode lead-out terminals from a power source 10a.

Figure 2:
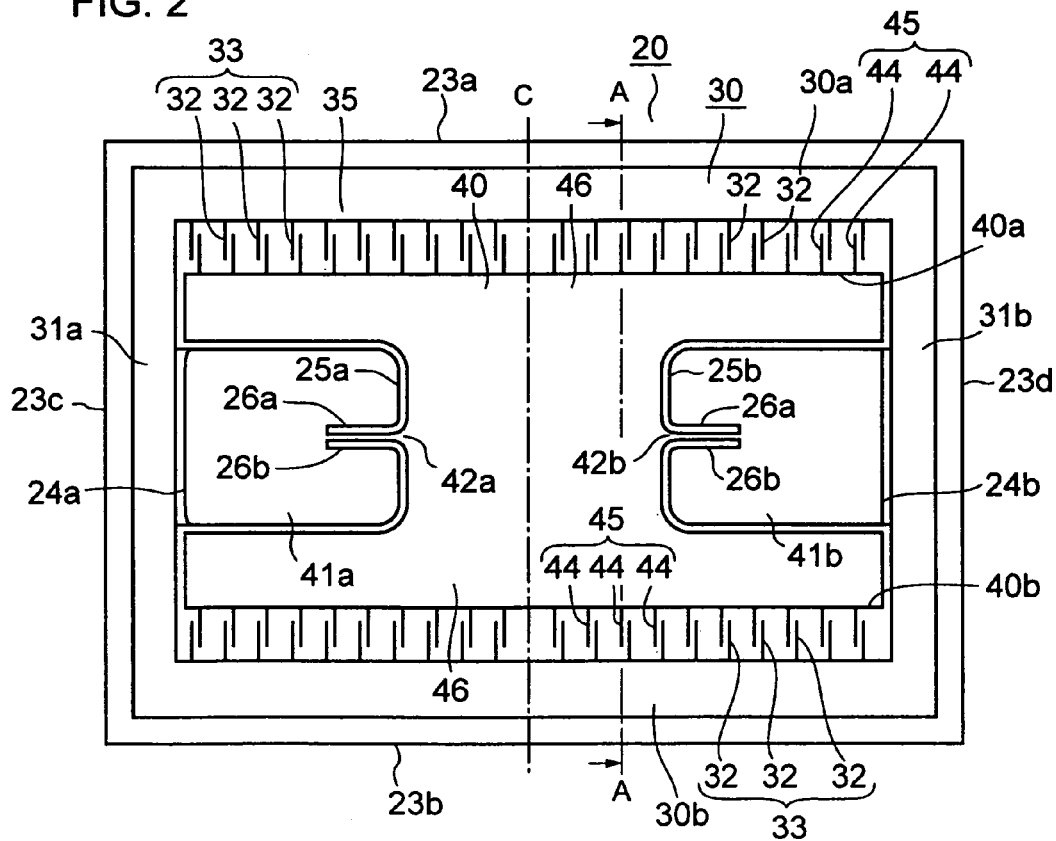
FIG. 2 is a schematic plan view of the comb-shaped actuator of the embodiment shown in FIG. 1.
Figure 3:
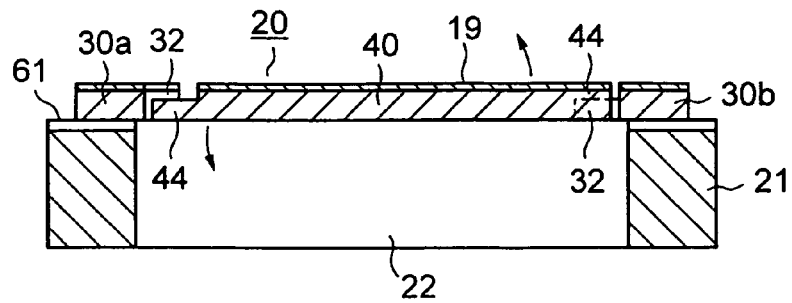
FIG. 3 is a cross sectional view seen in the direction of the arrow along A—A line of FIG. 2
Figure 4:
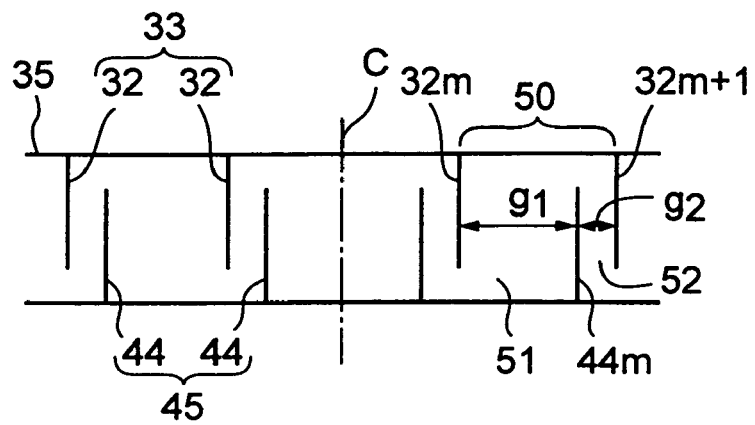
FIG. 4 is an enlarged plan view explaining an electrode finger of an embodiment of the present invention.

As shown in FIG. 2 and FIG. 3, the comb-shaped actuator 20 is provided with a conductive fixed electrode 30 and a conductive movable electrode 40 formed with a silicon (Si) layer on a frame-like Si substrate 21 on which an oxidized insulating film 61 having an opening 22 formed at the center thereof is formed. Fixed electrodes 30a, 30b are located on a pair of opposite sides of the substrate 21 e.g. the top and bottom sides 23a, 23b along an opening 22 respectively, and the pair of electrodes are electrically connected with each other through connecting layers 31a, 31b parallel to the outer edges of the other pair of opposite sides 23c, 23d of the substrate. As shown in FIG. 2 and FIG. 4, a plurality of comb-shaped fixed electrode fingers 32 protrude in parallel with each other perpendicularly from the base portion 35 of the fixed electrode with an equal interval on the opening 22 side of both fixed electrodes 30a, 30b, along the edges of the electrode base portions, which form a fixed electrode finger group 33.

On the inner edge of the opening 22 side of the left and right opposite sides 23c, 23d of the substrate 21, projecting portions 24a, 24b are protruded from the substrate. Fixed portions 41a, 41b doubling as electric connections of the movable electrode are provided on the upper surfaces of the projecting portions. Owing to the projecting portions formed, the opening 22 becomes H-shaped. The movable electrode 40 having an H-pattern approximately equal to the opening is provided on the opening 22. Concave incisions 26a, 26b are provided at each center of top ends 25a, 25b of the projecting portions 24a, 24b respectively. Corresponding to the incisions, two slits are cut in the fixed portions 41a, 41b, and then elongated suspension supporting members 42a, 42b formed in the slits and having a minute cross section for the movable electrode 40 are formed. The movable electrode 40 is integrally connected mechanically and electrically with the fixed portions 41a, 41b through the pair of suspension supporting members 42a, 42b, and suspended in the opening 22.

Figure 5A:
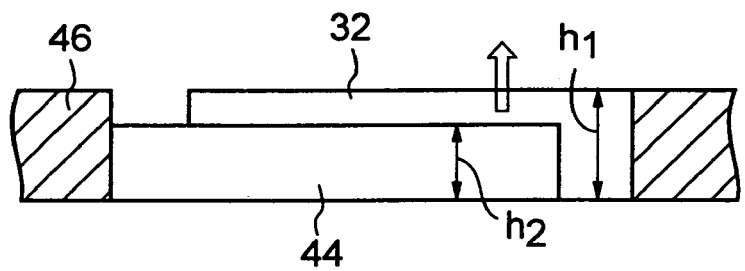
FIG. 5(A) and FIG. 5(B) are side views explaining the form and operation of a movable electrode.
Figure 5B:
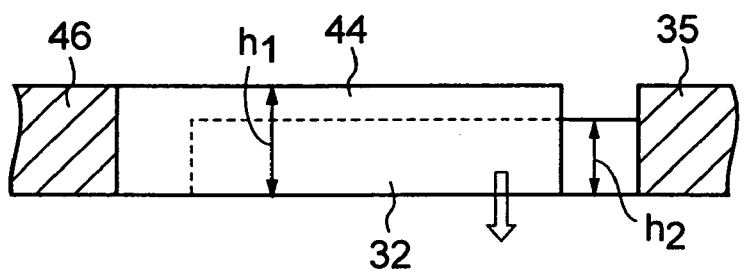

A movable electrode finger group 45 having electrode fingers 44 in the shape of teeth of a comb is provided arranged in parallel with each other with an interval along the longer opposite sides 40a, 40b on the top and the bottom of the movable electrode base portion 46 of the movable electrode 40. As shown in FIG. 5, the height h2 of the movable electrode finger 44 is smaller than the height h1 of the fixed electrode finger 32. The movable electrode finger group on the top side and the movable electrode finger group on the bottom side of the movable electrode in FIG. 2 have a reverse relationship to each other about the arrangement of the electrode fingers in the direction of height thereof as shown in FIG. 5(A) for the top side and FIG. 5(B) for the bottom side. Therefore, movement takes place as shown by the arrows in FIG. 5 when a potential difference between both electrodes occurs.

If the relationship of arrangement in the direction of height is made the same for both sides, the fixed electrodes 30a, 30b in pairs are made independent of each other and a voltage is applied to one of the fixed electrodes.

The fixed electrode finger group 33 of the fixed electrode and the movable electrode finger group 45 of the movable electrode are arranged face to face, and the electrode fingers 32, 44 of both electrodes are interdigitated to each other in non-contact manner to form an interdigital electrode arrangement.

The pattern of the movable electrode 40 is axisymmetrical to the center line C of the electrode crossing both the electrode finger groups at the center thereof. The electrode fingers are formed symmetrically to the center line C.

When the mth movable electrode finger 44m from the center line C of FIG. 4 toward the left or right outside is interposed between the mth fixed electrode finger 32m and the (m+1)th fixed electrode finger 32(m+1) adjacent thereto, the gap between the mth fixed electrode finger 32m and the mth movable electrode finger 44m i.e. the distance g1 of the gap 51 on the center line C side is formed to be larger than the gap between the (m+1)th fixed electrode finger 32(m+1) and the mth movable electrode finger 44m i.e. the distance g2 of the gap 52 on the outside.

A set of electrode fingers thus arranged, i.e. the arrangement in which the interdigitated position of one movable electrode finger $44_m$ is offset to the gap between two fixed electrode fingers $32_m$, $32_{(m+1)}$, in other words, the arrangement where the movable electrode finger $44_m$ is off-centered from the center of the gap $c_m$ of the two fixed electrode fingers $32_m$, $32_{(m+1)}$ is named as off-centered electrode finger unit 50 in the present invention. In this embodiment, the off-centered electrode finger unit 50 having the wider gap g1 on the center side on the basis of the center line C of axisymmetry are placed over the whole length of the electrode finger groups 33, 45. That is to say, any gap g1 is located closer to the center line C than the gap g2. As a variation, the relationship between the gap g1 and the gap g2 can be reversed.

Figure 6A:
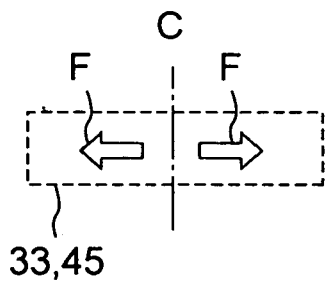
FIG. 6(A) and FIG. 6(B) are schematic diagram explaining operation of an embodiment of the present invention.

Upon placing symmetrically the off-centered electrode finger unit with respect to the center line like the above, an attracting force component of the electrostatic force outward the movable electrode is generated on the basis of the center line C in each off-centered electrode finger unit, so that the attracting force F increases and balances in reference to the center line C as shown in FIG. 6(A). The attracting force component as action and reaction can be easily controlled and balanced if it is large to some extent. Therefore, variation of the attracting force due to dimension errors of the shape of the electrode generated during manufacturing process thereof can be easily compensated. In the case of a micro structure having a dimension of the electrode finger of e.g. 100 µm in length, 50 µm in height and 15 µm in width or less, the ratio of the distance g1 of the wider gap region to the distance g2 of the narrower gap region is preferably 1:1.2 to 1.5. If the ratio is less than 1:1.2, the electrostatic force of the off-centered electrode finger unit is prone to vary under the influence of manufacturing errors in dimension. If the ratio is not less than 1:2.5, the fixed electrode finger and the movable electrode finger are prone to come into contact with each other at the narrower gap side. The ratio is set to be 1:1.5 in this embodiment.

One surface of the movable electrode 40 is provided with a mirror 19 formed with a reflection layer of a deposited layer or a multi-layered interference film of silver (Ag) or aluminum (Al) as well as gold (Au). The movable electrode 40 is supported axially by the suspension supporting members 42a, 42b. Upon a voltage being applied between the movable electrode 40 and the fixed electrode 30, the movable electrode 40 is driven electrostatically by the electrode finger group and turns. Accompanied by the turning above, an angle of the mirror to the light axis of the light emanated from the fiber 15 shown in FIG. 1 is regulated.

Though the off-centered electrode finger unit is applied throughout the whole length of the electrode finger group in the above embodiment, it also can be naturally applied to a part thereof. Other electrode finger units are 'centered electrode finger unit' in which one movable electrode finger $44_m$ is positioned at the gap center $c_m$ between two fixed electrode fingers $32_m$, $32_{(m+1)}$. For example, it can be placed alternately, or with being concentrated in the vicinity of the end of the electrode finger group. An electrode finger group whose gap intervals are not the same can also be available. In both cases above, what is necessary is just to make the electrostatic force in the gap between electrode fingers of the off-centered electrode finger unit be symmetrical so as to be larger than an undesirable rotating electrostatic force in the direction of the movable electrode surface caused by manufacturing errors of electrode fingers which are not biased.

Figure 6B:
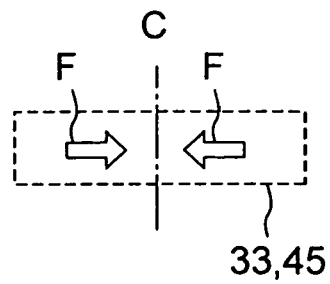

In addition, although the attracting force toward the outside was increased as shown in FIG. 6(A) upon making the distance of the center side gap of the off-centered electrode finger unit be wider than the distance of the outside gap thereof in the embodiment mentioned above, the force can also be balanced to the contrary on the basis of the center line C upon making the distance of the center side gap be narrower than the distance of the outside gap in order to increase the attracting force F toward the center side as shown in FIG. 6(B). Furthermore, a plurality of off-centered electrode finger units having a reverse relationship to each other with regard to the gap can be located in an interlaced manner on the right and the left of the center line C respectively. Undesirable deviation of the electrostatic force due to manufacturing errors can be dissolved by forming actively the off-centered electrode finger unit.

Manufacturing method for this embodiment will be explained hereinafter referring to FIG. 7. To facilitate understanding, the figure shows schematically the movable electrode 40 having electrode fingers 44 with height h2 lower than the fixed electrode 30 with height h1 shown by FIG. 8(A). Height of the movable electrode finger base portion 46 is h1. The fixed electrode 30 having fixed electrode fingers 32, which protrudes from the fixed electrode finger base portion 35 is shown with simplification though it is manufactured simultaneously.

(Process A)

As shown in FIG. 7(A), an SOI substrate comprising a mono-crystalline silicon (Si) substrate 21 of 500 μm in thickness and a mono-crystalline Si electrode layer 62 of 50 μm in thickness deposited thereon through a Si oxide film 61 is prepared, and then an aluminum (Al) layer 63 to be used as a mask in a post-process is deposited on the electrode layer 62 by sputtering. Openings 63a is formed by removing a part of the Al layer 63 on the region 44a of the Si electrode layer 62 which becomes the movable electrode finger 44 (FIG. 4) by etching.

(Process B)

As shown in FIG. 7(B), after the upper surface of the substrate including the Al layer is covered with a photoresist layer 64, mask holes 64a, 64b, 64c are formed by removing a part of the region of the photoresist layer 64 upon photolithography process it with a photo-mask for forming principally the movable electrode pattern of the actuator. The Si electrode layer under the mask holes 64a and 64c is the region to be removed later as the gaps between the movable electrode 40, the fixed electrode 30 and the projecting portions 24a, 24b shown in FIG. 2. The mask hole 64b is configured to form the concave incisions 26a, 26b on the top ends 25a, 25b of the projecting portions 24a, 24b, and the space between the concisions is a region to become the suspension supporting members 42a, 42b (FIG. 2).

The Si electrode layer 62 in the region under the mask holes 64a, 64b, 64c is etched up to 30 μm in depth by anisotropic etching using ion.

(Process C)

As shown in FIG. 7(C), the photoresist layer 64 is removed, and then the Si electrode layer 62 is further etched with the exposed Al layer 63 as a mask by anisotropic etching with ion. The remaining region 62a of about 20 μm in thickness, which has already etched to 30 μm in depth, is removed and etched until the Si oxide layer 61 is exposed. Thus, the region 44a of the opening 63a is also trimmed by 20 μm to become the movable electrode finger 44 having 30 μm in height (in the direction of the thickness of the Si electrode layer).

(Process D)

As shown in FIG. 7(D), the Al layer 63 is removed and then photoresist films 65, 66 are coated on both surfaces of the substrate. The resist film 66 to form the opening 22 in the back surface of the substrate is irradiated by a light and developed to form a mask hole. Then, anisotropic etching is carried out to remove the Si region 21 and the Si oxide film 61 under the mask hole to form the opening 22.

Figure 8A:
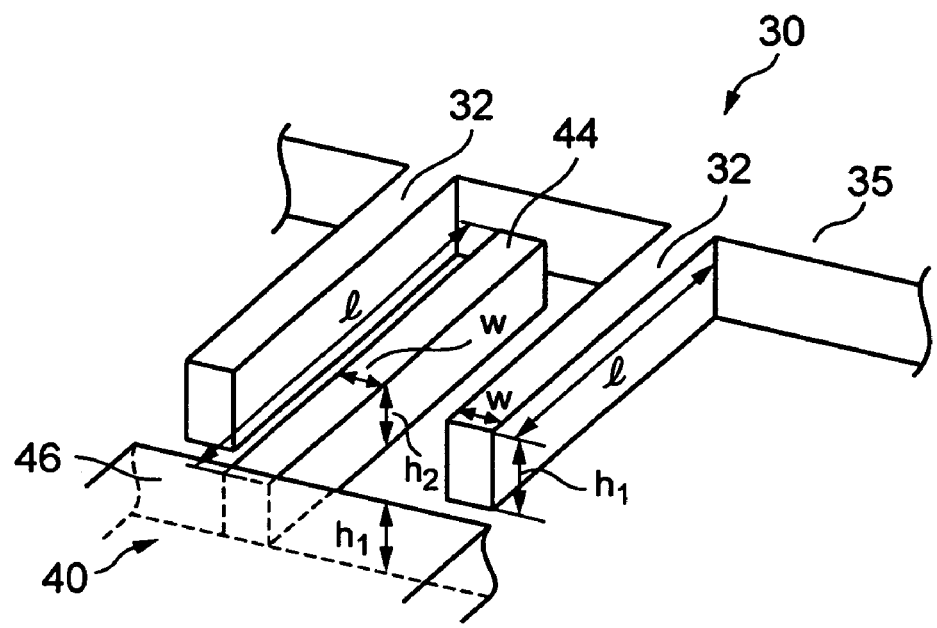
FIG. 8(A) is a schematic plan view explaining another embodiment of the present invention.

The dimension of the fixed electrode finger 32 and the movable electrode finger 44 thus obtained is 15 μm in width w (refer to FIG. 8(A)) and 100 μm in length l. 50 pairs of the electrode fingers thus obtained are arranged in parallel with each other on both sides each of the center line C (FIG. 2) along the side edge of the movable electrode base portion 46. The suspension supporting member 42 is simultaneously formed oblong as it has the width of 5 μm and the height of 50 μm.

(Process E)

As shown in FIG. 7(E), the photoresist films 65, 66 are removed and Au layer 67 is deposited on the upper surface of the Si electrode layer 62 by sputtering. The Au layer acts as the mirror 19 on the movable electrode, and doubles as a bonding pad supplying a voltage to the fixed electrode 30 and the fixed portions 41a, 41b of the movable electrode. The portion 32 represented by dotted lines shows the fixed electrode finger.

The comb-shaped actuator of 2 mm×3 mm rectangle having the fixed electrode, the movable electrode and the suspension supporting member formed on the same surface is manufactured as mentioned above. The actuator is mounted on the stem 11 of the envelope shown in FIG. 1, and the fixed electrode and the movable electrode are connected with the electrode lead terminals 12, 13 through bonding wires. The optical fibers 15, 16, the twin core fiber collimator 17 and the lens 18 are assembled, and then the components above are accommodated in a cap becoming the cylindrical envelope 14 later and sealed so that the light variable attenuator 10 can be manufactured.

Figure 8B:
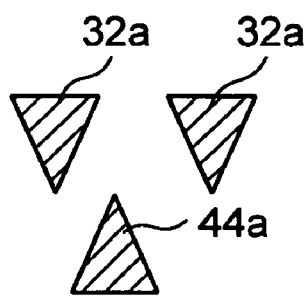
FIG. 8(B) and FIG. 8(C) are cross sectional views showing variations of the electrode finger.
Figure 8C:
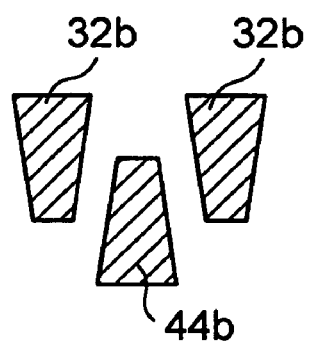

In this embodiment as shown in FIG. 8(A), the cross sections of the fixed electrode 32 and the movable electrode 44 are shaped like a rectangle extending in the direction of thickness h1, h2 of the substrate. As a variation of the shape of cross section of these electrodes in addition, the movable electrode finger 44 having a cross section of an approximate triangle and the fixed electrode finger 32 having a cross section of an approximate inverse triangle can be available as shown in FIG. 8(B), so as to increase attractive driving by an electrostatic force. Moreover, the movable electrode finger 44b of a trapezoid and the fixed electrode finger 32b of an inverse trapezoid can also be available.

Furthermore, the suspension supporting member 42 of this embodiment has an oblong cross section in the direction of thickness of the substrate like the fixed electrode 32 and the movable electrode 44. In order to suppress swinging of the movable electrode 44 in the direction of surface thereof upon increasing strength of the suspension supporting member in the direction of width thereof, a projecting portion can be formed in the direction of width thereof. FIGS. 9(A) to 9(D) show variations thereof.

Figure 9A:
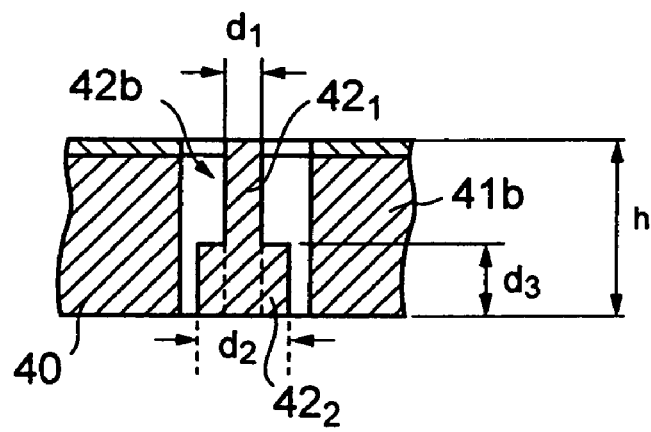
FIG. 9(A) to FIG. 9(E) are enlarged schematic views explaining other embodiments of the present invention.

As shown in FIG. 9(A), the suspension supporting member 42 (42a, 42b) has a platy structure of a T-shaped cross section, comprising an axial core portion $42_1$ having a cross section of an elongated rectangle with a width d1 and a projecting portion $42_2$ having a cross section with a larger width d2 on the bottom end of the figure. Thanks to the structure, movement of the movable electrode 40 in the direction of the width of the suspension supporting member 42b (42a) can be remarkably suppressed compared to the conventional structure having only the axial core portion. Big effect can be expected even if the height d3 of the projecting portion $42_2$ is smaller than the height d0 of the axial core portion $42_1$. Ratio of the height d3 to the width d2 of the projecting portion is preferably 1:1.2 or more for torsion resist and mechanical strength.

Figure 9B:
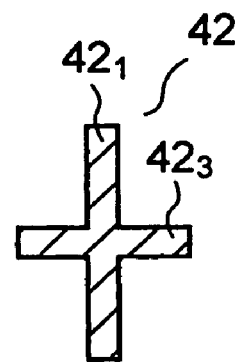

The cross section of the suspension supporting member 42 in FIG. 9(B) is formed like a cross. The height of the axial core portion $42_1$ elongates in the direction of the thickness h of the substrate and the projecting portion $42_3$ is formed crossing the axial core portion $42_1$ at an angle of 90 degrees. Thanks to the cross shape, the movable electrode 40 is securely fixed to the fixed portions 41a, 41b even if the length of the supporting members 42 is lengthened, and moreover torsion of the supporting member itself caused by turning of the movable electrode 40 takes place smoothly.

Figure 9C:
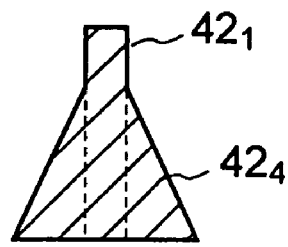
Figure 9D:
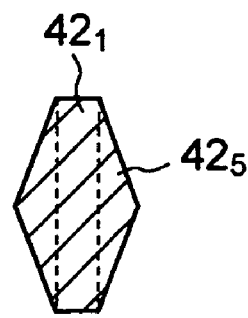
Figure 9E:
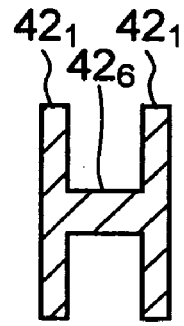

A structure having a projecting portion $42_4$ of a triangular cross section with the bottom end of the axial core portion $42_1$ as the base thereof as shown by FIG. 9(C), a structure having rhombic portions $42_5$ expanded from the axial core portion $42_1$ as shown by FIG. 9(D), or a structure of an H-shaped cross section having the axial core portion $42_1$ as shown by FIG. 9(E) formed with a pair of thin parallel plates and a connecting portion $42_6$ coupling the plates at the center thereof can be utilized as a variation of the suspension supporting member. One side of the H-shaped axial core portion doubles as the projecting portion. Furthermore, a suspension supporting member having a Z-shaped, U-shaped or trapezoidal cross section is available. These variations can be applied to other embodiments.

(Second Embodiment)

This embodiment is an actuator in which the position of the suspension supporting member of the movable electrode corresponds to a cantilever structure that is equivalent to the upper half of the first embodiment mentioned above.

Figure 10A:
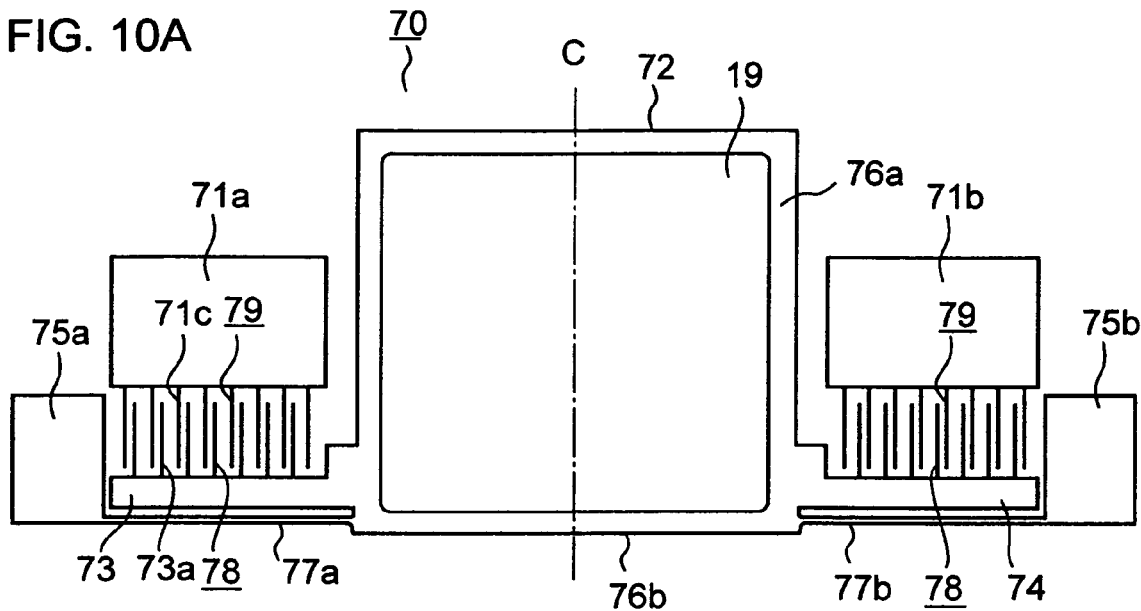
FIG. 10(A) is a schematic plan view explaining another embodiment of the present invention.

As shown in FIG. 10(A), (B), the comb-shaped actuator 70 is provided with a movable electrode body 72 of an axisymmetrical T-pattern centered on the axisymmetrical center line C, left and right arm portions 73, 74 extended from the body to become the electrode base portions, and a pair of fixed electrodes 71a, 71b on the upper edges thereof. On the tip end sides of the left and right arm portions 73, 74, fixed portions 75a, 75b fixing the movable electrode and doubling as the electrode pad of the movable electrode are provided a certain spacing apart therefrom. The upper extended portion 76a of the movable electrode forms the body of the movable electrode, and a mirror 19 is formed on one side thereof. The lower extended portion 76b of the movable electrode protrudes slightly from the bottom edges of the left and right arm portions 73, 74. Suspension supporting members 77a, 77b are prepared from the side edges of the lower extended portion up to the fixed portions 75a, 75b, and hang the movable electrode 72 on the fixed portions 75a, 75b.

Figure 10B:
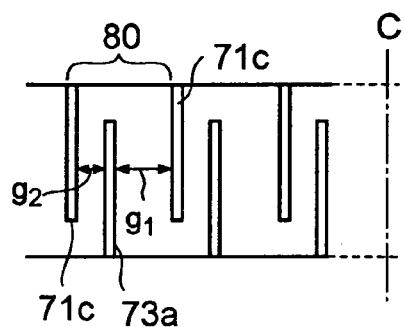
FIG. 10(B) is a partly enlarged schematic plan view of FIG. 10(A).

The movable electrode finger group 78 constituted of a plurality of movable electrode fingers 73a is formed on the upper side of the left and right arm portions 73, 74 of the movable electrode, and the fixed electrode finger group 79 constituted of a plurality of fixed electrode fingers 71c is formed on the sides of the fixed electrodes 71a, 71b facing the movable electrodes. The movable electrode finger group 78 and the fixed electrode finger group 79 are interdigitated together. As shown in FIG. 10(B), the structural arrangement of the movable electrode finger 73a and the fixed electrode finger 71c is the same as the structural arrangement of the first embodiment. The off-centered electrode finger unit 80 is located over the whole length of the electrode finger group. That is to say, off-centered electrode finger unit 80 comprises one movable electrode finger 73a and a pair of fixed electrode fingers 71c interposing the movable electrode finger between them. The unit has a wider gap g1 and a narrower gap g2 formed between the movable electrode and each of the pair of fixed electrodes.

In this embodiment, the wider gap g1 of the off-centered electrode finger unit of the left side electrode finger group is located on the center line C side, and the wider gap g1 of the off-centered electrode finger unit of the right side electrode finger group is also located on the center line C side on the basis of the axisymmetrical center line C in order to balance the electrostatic force generated over the whole electrodes. When a voltage is applied between the fixed electrode and the movable electrode, an electrostatic force is generated between the electrode fingers. The movable electrode 72 then turns around the suspension supporting members 77a, 77b as a fulcrum and thereby the angle of the mirror 19 is regulated. Keeping a certain voltage, the movable electrode is set in halt condition, and consequently a desirable mirror angle is fixed.

(Third Embodiment)

Figure 11:
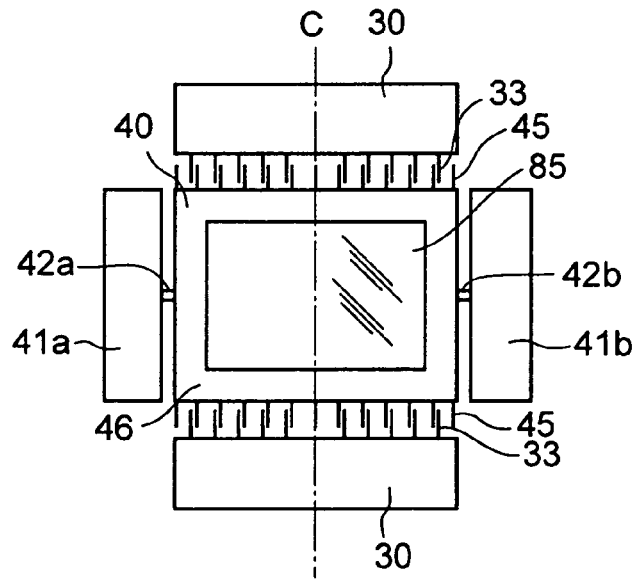
FIG. 11 is a schematic plan view explaining another embodiment of the present invention.

As shown in FIG. 11, this embodiment has a structure in which the movable electrode 40 is provided with a transparent interference filter 85. Each part denoted by the same mark as the first embodiment designates the same part as that of the first embodiment. The interference filter 85 is formed by a multi-layered interference film deposited on the movable electrode base portion 46. The electrode finger groups 33, 45 are constituted of the off-centered electrode finger unit arranged symmetrically on the basis of the center line C, to assure easiness of manufacturing and controlling. The cross section of the suspension supporting members 42a, 42b is formed in T-shape. This interference film can also be a reflection type mirror.

(Fourth Embodiment)

Figure 12A:
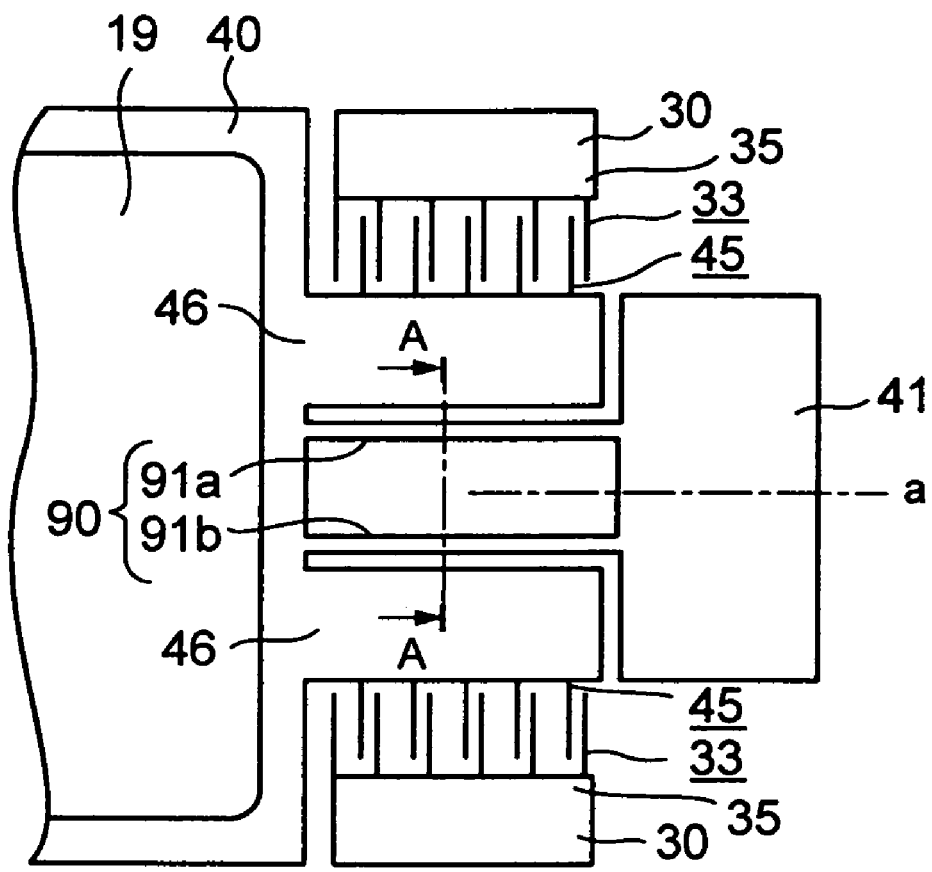
FIG. 12(A) is a schematic plan view explaining another embodiment of the present invention.

In this embodiment, the suspension supporting member 90 between the movable electrode 40 and the fixed portion 41 is constituted of two thin bars 91a, 91b as shown in FIG. 12(A), different from the suspension supporting member of a single bar in the first embodiment. Each part denoted by the same mark as the first embodiment designates the same part as that of the first embodiment. Because the supporting member is formed by the adjacent two thin lines, the movable electrode 40 can be securely supported by a supporting member of a relatively small cross section.

The suspension supporting member 90 is extremely vulnerable because it has a minute structure having a cross section of 5 μm×50 μm or less and is made of such as single crystal silicon (Si). Therefore, the dimension thereof must be enlarged in order to ensure its mechanical strength for the suspension of the movable electrode. However, enlarging the dimension causes limitations for torsion control of the suspension supporting member to turn the movable electrode. Such inconvenience can be prevented upon supporting axially (axial line a) the movable electrode with adjacent two supporting members like this embodiment.

Figure 12B:
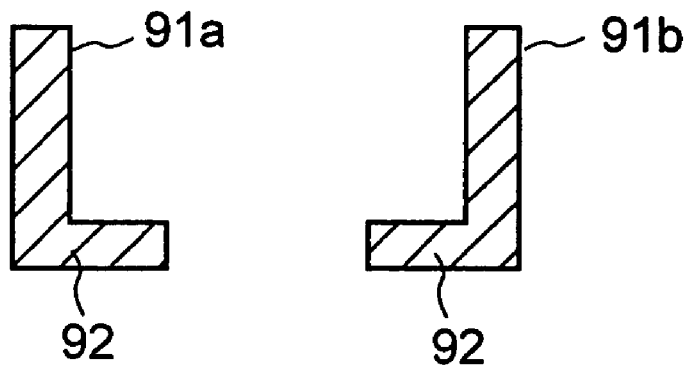
FIG. 12(B) is an enlarged cross sectional view seen in the direction of the arrow along A—A line of FIG. 12(A).
Figure 13:
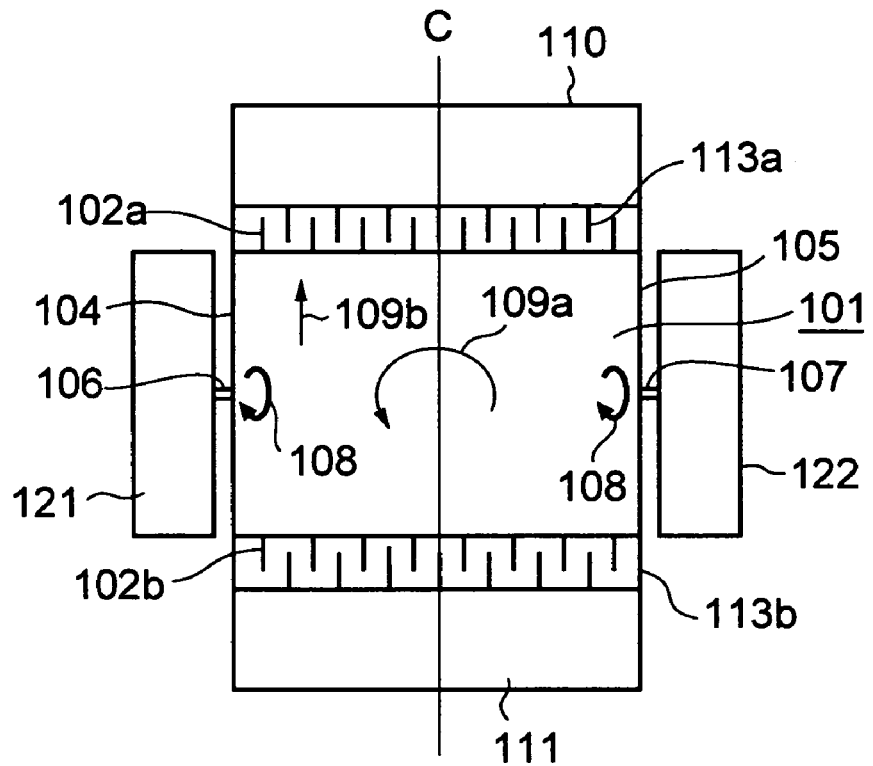
FIG. 13 is a schematic plan view explaining another embodiment of the present invention.
Figure 14:
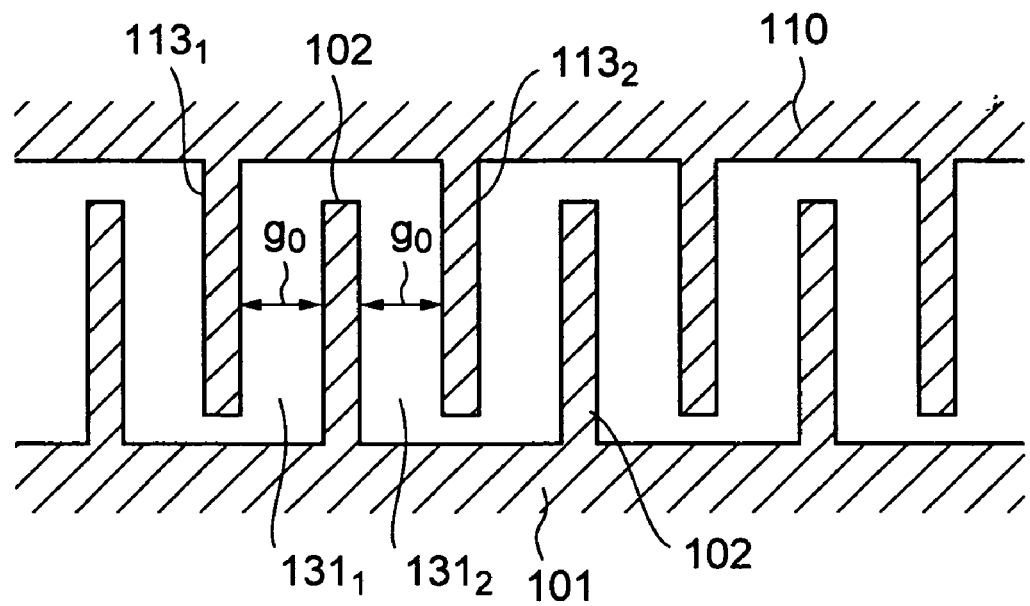
FIG. 14 is a schematic diagram explaining electrode fingers of the conventional comb-shaped actuator.

As shown in FIG. 12(B), the suspension supporting members 91a, 91b of this embodiment further have an L-shaped cross section whose expanding directions of both projecting portions 92 are arranged face to face with each other. Thereby, this embodiment can be more balanced against torsion.

The present invention was explained using the embodiments described above, but the scope of the present invention is not limited to these embodiments. For example, configuring the wider gap and the narrower gap of the off-centered electrode finger unit can be carried out by making each spacing between the fixed electrode finger and the movable electrode finger in the direction of width thereof be the same dimension over the entire length of the electrode fingers, or can also be carried out by making the spacing above be not the same dimension. For instance, the movable electrode finger can be tapered off in order that the electrostatic force component applied to the whole electrode fingers can be off-centered in the desirable direction. The top of the electrode finger can be processed in a shape of round, chamfered, acute angular, concaved, or curved surface so that a biased electrostatic force is generated. Moreover, a side edge of an electrode finger can be curved to a side edge of another electrode finger facing thereto. To be brief, the effect of the present invention can be obtained if a wider gap and a narrower gap can be set as a whole even though the non-parallel structure like the above is employed.

In addition, as variations of the electrode finger, the cross section of the electrode finger can be not only a rectangle but also a quadrangle such as a trapezoid or a rhombus, a triangle, or other polygons. When the movable electrode finger is trapezoidal or triangular, movable range of the movable electrode in the direction of gap can be widened upon the fixed electrode finger being inverse-trapezoidal or inverse-triangular so as to combine the two electrodes in inverse shapes to each other with respect to the vertical direction thereof.

Though the off-centered electrode finger unit is constituted of a pair of fixed electrode fingers and one movable electrode finger in the embodiments mentioned above, it can also be constituted of a pair of movable electrode fingers and one fixed electrode finger. Each fixed electrode finger can double as the fixed electrode finger of the neighboring unit. The off-centered electrode finger unit can be constructed by forming a wider gap and a narrower gap between two fixed electrode fingers interposing a movable electrode finger for every two movable electrode fingers.

The abovementioned embodiment has a structure applying a common voltage to a pair of the fixed electrodes. However, any independent voltage can be applied to each fixed electrode upon separating these electrodes from each other.

In the embodiments mentioned above, the electrode is constituted of a silicon (Si) layer as the base thereof and a gold (Au) layer deposited thereon. However, conductive electrodes can also be formed only by semiconductor such as Si, or can comprise an insulator as the electrode base and a metallic layer of e.g. Au provided thereon. Integrally formed suspension supporting member can be the same construction. Furthermore, metallic layer itself can be available for formation thereof.

Upon constituting the movable electrode and the fixed electrode with magnetic material, an attracting force can be generated by a magnetic field applied between both electrodes.

Although the abovementioned embodiments were explained by means of comb-shaped actuators of light variable attenuators, it is needless to say that the invention can be applied to photo switches of optical communication systems, wavelength converters of laser resonators, wavelength filters, etc.

What is claimed is:

1. A comb-shaped actuator comprising:
   a substrate having an opening formed therein;
   a fixed electrode comprising a fixed electrode base portion provided along an inner side of the opening on the substrate and a plurality of fixed electrode finger groups arranged in parallel with each other in the shape of teeth of a comb throughout a predetermined length on the fixed electrode base portion;
   a movable electrode located in the opening of the substrate and comprising a movable electrode base portion and a plurality of movable electrode fingers arranged in parallel with each other in the shape of teeth of a comb facing the fixed electrode throughout a predetermined length, the movable electrode being movable by an attracting force generated between the fixed electrode finger and the movable electrode finger subject to an electric field or a magnetic field applied between the movable electrode and the fixed electrode upon arranging the movable electrode fingers and the fixed electrode fingers in an interdigital pattern with a gap between them; and
   a suspension supporting member connecting the movable electrode integrally with the substrate and suspending movably the movable electrode from the substrate,
   both the fixed electrode and the movable electrode comprising a plurality of electrode finger units containing two fixed electrode fingers next to each other and the movable electrode finger interposed between the two fixed electrode fingers, at least two of the electrode finger units comprising off-centered electrode finger units having one of the movable electrode fingers being off-centered with respect to a central position between two of the fixed electrode fingers, the off-centered electrode finger units being located on both sides of a central line dividing both the fixed electrode and the movable electrode along the opening into two parts, and directions of off-centering of the both sides being inverse to each other.

2. The comb-shaped actuator as stated in claim 1, wherein both the fixed electrode and the movable electrode comprise the electrode finger unit having a centered fixed electrode finger located at a central position thereof and the off-centered electrode finger unit having an off-centered fixed electrode finger.

3. The comb-shaped actuator as stated in claim 2, wherein all the electrode finger units are off-centered electrode finger units.

4. The comb-shaped actuator as stated in claim 1, wherein the fixed electrode and the movable electrode are placed on a same plane.

5. The comb-shaped actuator as stated in claim 1, wherein the fixed electrode finger and the movable electrode finger are different from each other in height thereof.

6. The comb-shaped actuator as stated in claim 1, wherein the suspension supporting member forms an axis to have the movable electrode turned around it.

7. The comb-shaped actuator as stated in claim 1, wherein a cross-sectional surface of the suspension supporting member is formed oblong in height thereof is extending in a direction of thickness of the substrate.

8. The comb-shaped actuator as stated in claim 7, wherein the cross-sectional surface of the suspension supporting member comprises a projecting portion in a direction of width thereof.

9. The comb-shaped actuator as stated in claim 8, wherein the cross-sectional surface of the suspension supporting member is T-shaped or cross-shaped.

10. The comb-shaped actuator as stated in claim 1, wherein the movable electrode finger has a cross-sectional surface shaped approximately like a triangle or a trapezoid and the fixed electrode finger has a cross-sectional surface shaped approximately like an inverse triangle or an inverse trapezoid.

11. The comb-shaped actuator as stated in claim 1, wherein a mirror is provided on one surface of the movable electrode.

12. The comb-shaped actuator as stated in claim 1, wherein a voltage is applied between the fixed electrode and the movable electrode.

13. The comb-shaped actuator as stated in claim 1, wherein the movable electrode is approximately formed as a quadrangle, facing two sides thereof being provided with the movable electrode fingers, remaining two sides thereof being connected with the suspension supporting member, and a pair of the fixed electrode being placed on the substrate corresponding to the movable electrode finger of the two sides.

14. The comb-shaped actuator as stated in claim 1, wherein a voltage is applied to the movable electrode through the suspension supporting member.

15. A comb-shaped actuator comprising:
a substrate having an opening formed therein;
a fixed electrode comprising a fixed electrode base portion provided along an inner side of the opening on the substrate and a plurality of fixed electrode fingers arranged in parallel with each other in the shape of teeth of a comb throughout a predetermined length on the fixed electrode base portion;
a movable electrode located in the opening of the substrate and comprising a movable electrode base portion and a plurality of movable electrode fingers arranged in parallel with each other in the shape of teeth of a comb facing the fixed electrode, the movable electrode being movable by an attracting force generated between the fixed electrode finger and the movable electrode finger subject to an electric field or a magnetic field applied between the movable electrode and the fixed electrode upon arranging the movable electrode fingers and the fixed electrode fingers in an interdigital pattern with a gap between them; and
a suspension supporting member connecting integrally the movable electrode with the substrate and suspending movably the movable electrode from the substrate,
the fixed electrode and the movable electrode comprising a plurality of electrode finger units containing a first fixed electrode finger, a second fixed electrode finger next to each other and one movable electrode finger interposed between the two fixed electrode fingers, at least two units thereof being off-centered electrode finger units forming a wider gap region between the movable electrode finger and the first fixed electrode finger and forming a narrower gap region between the movable electrode finger and the second fixed electrode finger, both being different from each other in width, the off-centered electrode finger units being located throughout a predetermined length of both the electrodes, in order to balance substantially whole electrostatic forces over the predetermined length of both the electrodes by the electrode finger units.

16. The comb-shaped actuator as stated in claim 15, wherein the wider gap region and the narrower gap region of the plurality of the off-centered electrode finger units are placed symmetrically to each other with respect to an axisymmetrical center line of the fixed electrode and the movable electrode.

17. The comb-shaped actuator as stated in claim 15, wherein the movable electrode fingers are placed separately on both sides of the axisymmetrical center line of the movable electrode.

18. The comb-shaped actuator as stated in claim 15, wherein a ratio of the gap width of the narrower gap region to the gap width of the wider gap region is 1:1.2 to 1:2.5.

19. The comb-shaped actuator as stated in claim 15, wherein a gap between the fixed electrode finger and the movable electrode finger is substantially parallel to length of these electrode fingers.

20. The comb-shaped actuator as stated in claim 15, wherein at least one of the wider gap region and the narrower gap region between the fixed electrode finger and the movable electrode finger is not parallel to length of the electrode finger.

* * * * *

UNITED STATES PATENT AND TRADEMARK OFFICE
CERTIFICATE OF CORRECTION

PATENT NO.         : 7,224,097 B2                                              Page 1 of 1
APPLICATION NO. : 11/042155
DATED              : May 29, 2007
INVENTOR(S)        : Hiroshi Obi et al.

It is certified that error appears in the above-identified patent and that said Letters Patent is hereby corrected as shown below:

On the Cover Page, item (73), Assignees:
    Please delete "Yamichi Electroncis Co., Ltd." and insert -- Yamaichi Electronics Co., Ltd. --

On the Cover Page, item (73), Assignees:
    Please delete "Koshin Kogaku co., Ltd." and insert -- Koshin Kogaku Co., Ltd. --

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,224,097 B2  Page 1 of 1
APPLICATION NO. : 11/042155
DATED : May 29, 2007
INVENTOR(S) : Hiroshi Obi et al.

It is certified that error appears in the above-identified patent and that said Letters Patent is hereby corrected as shown below:

On the Title Page, Item (73), Assignees:
Please delete "Yamichi Electroncis Co., Ltd." and insert -- Yamaichi Electronics Co., Ltd. --

On the Title Page, Item (73), Assignees:
Please delete "Koshin Kogaku co., Ltd." and insert -- Koshin Kogaku Co., Ltd. --

Signed and Sealed this

Sixth Day of January, 2009

JON W. DUDAS
*Director of the United States Patent and Trademark Office*